Oct. 21, 1958  G. A. LYON  2,857,023
WHEEL COVER
Filed Feb. 21, 1955  4 Sheets-Sheet 2
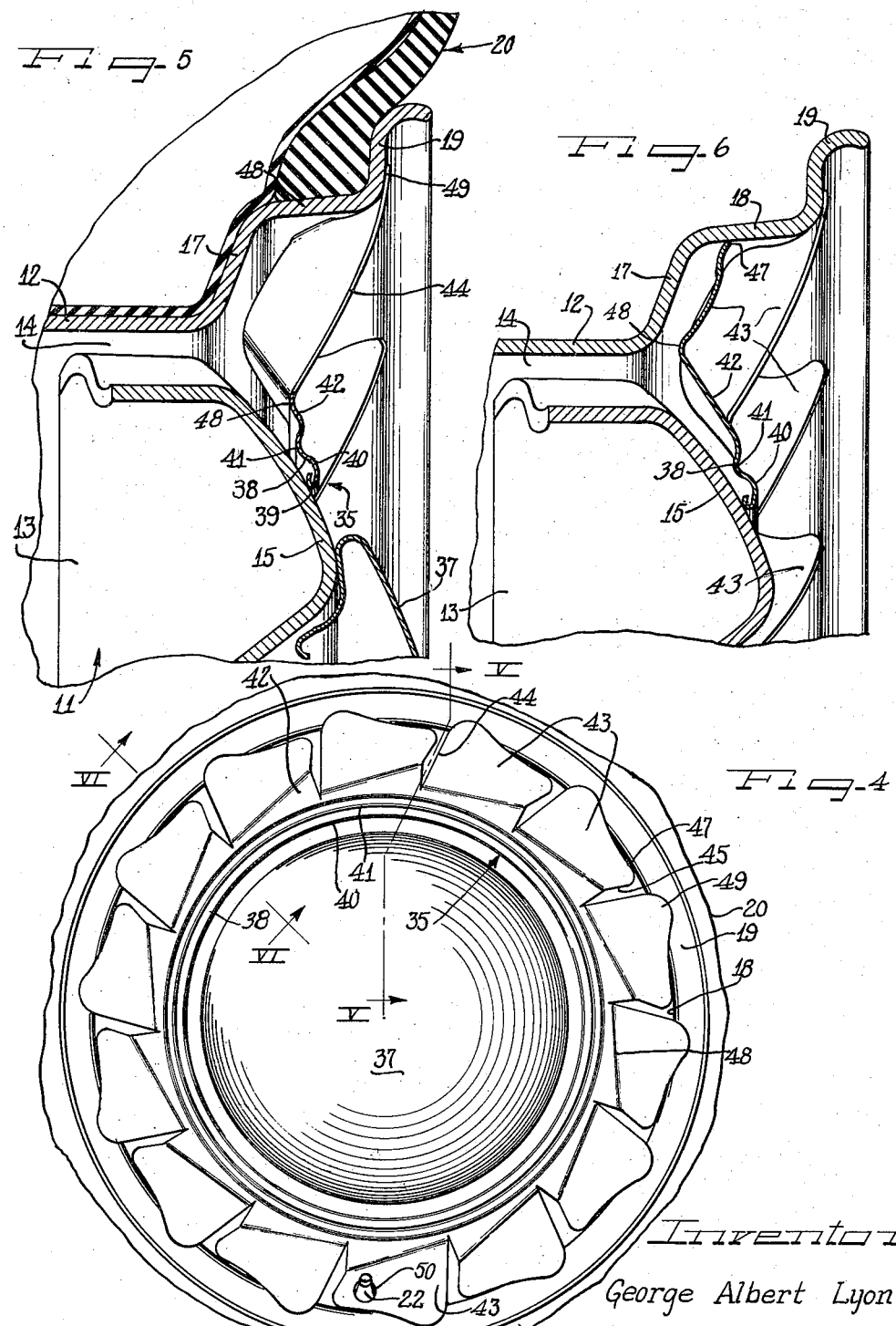
Inventor
George Albert Lyon Oct. 21, 1958  G. A. LYON  2,857,023
WHEEL COVER
Filed Feb. 21, 1955  4 Sheets-Sheet 3
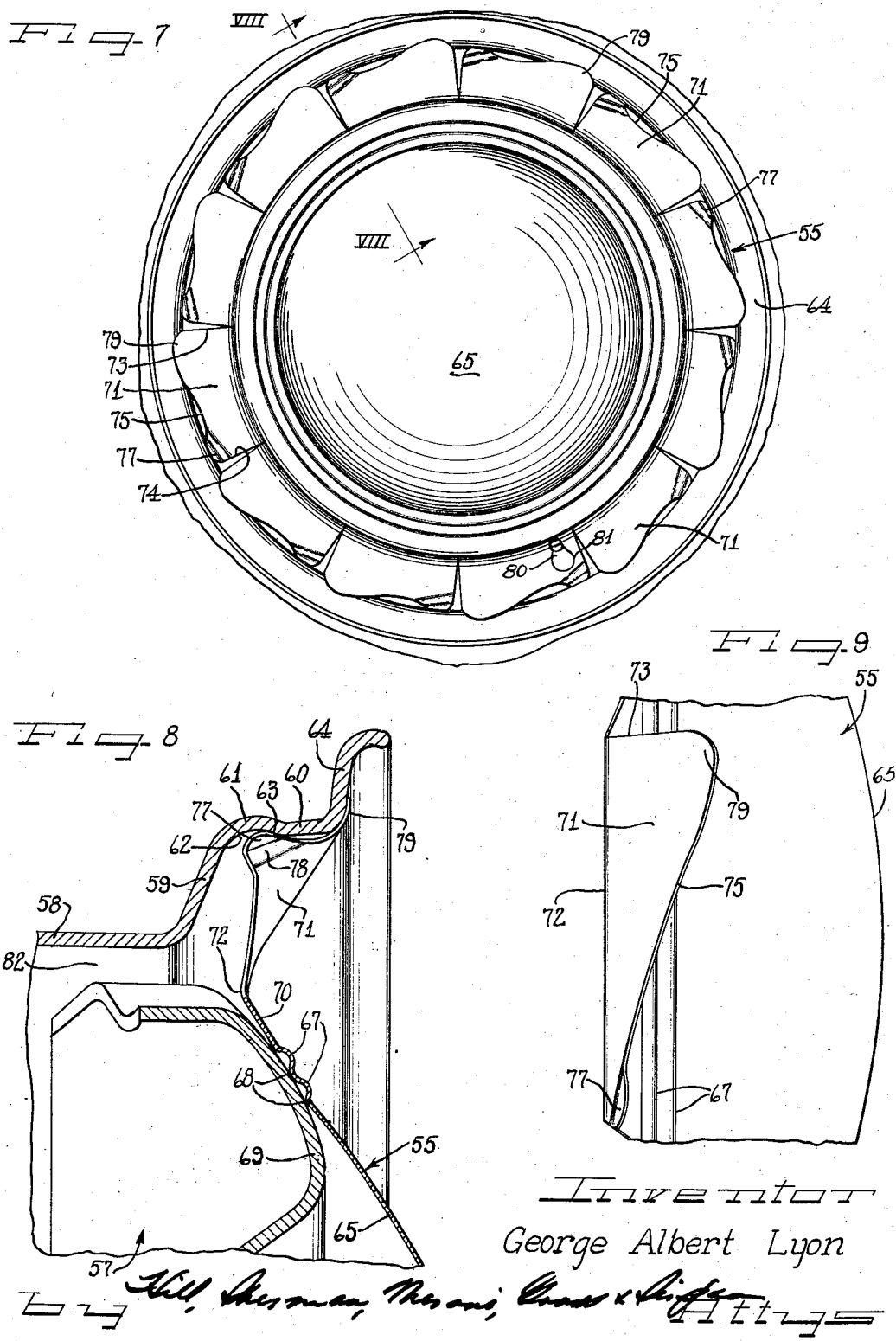
Inventor
George Albert Lyon

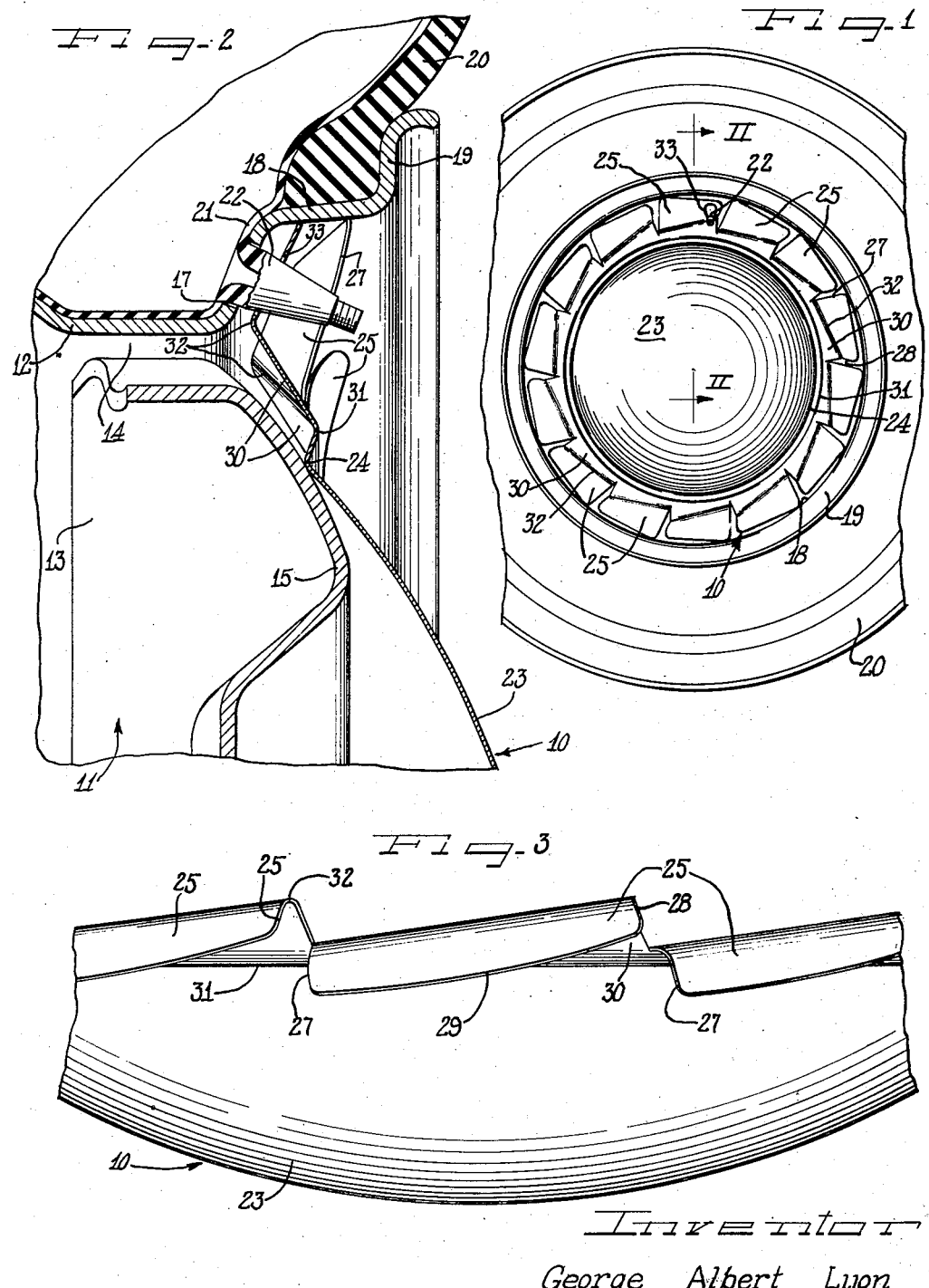

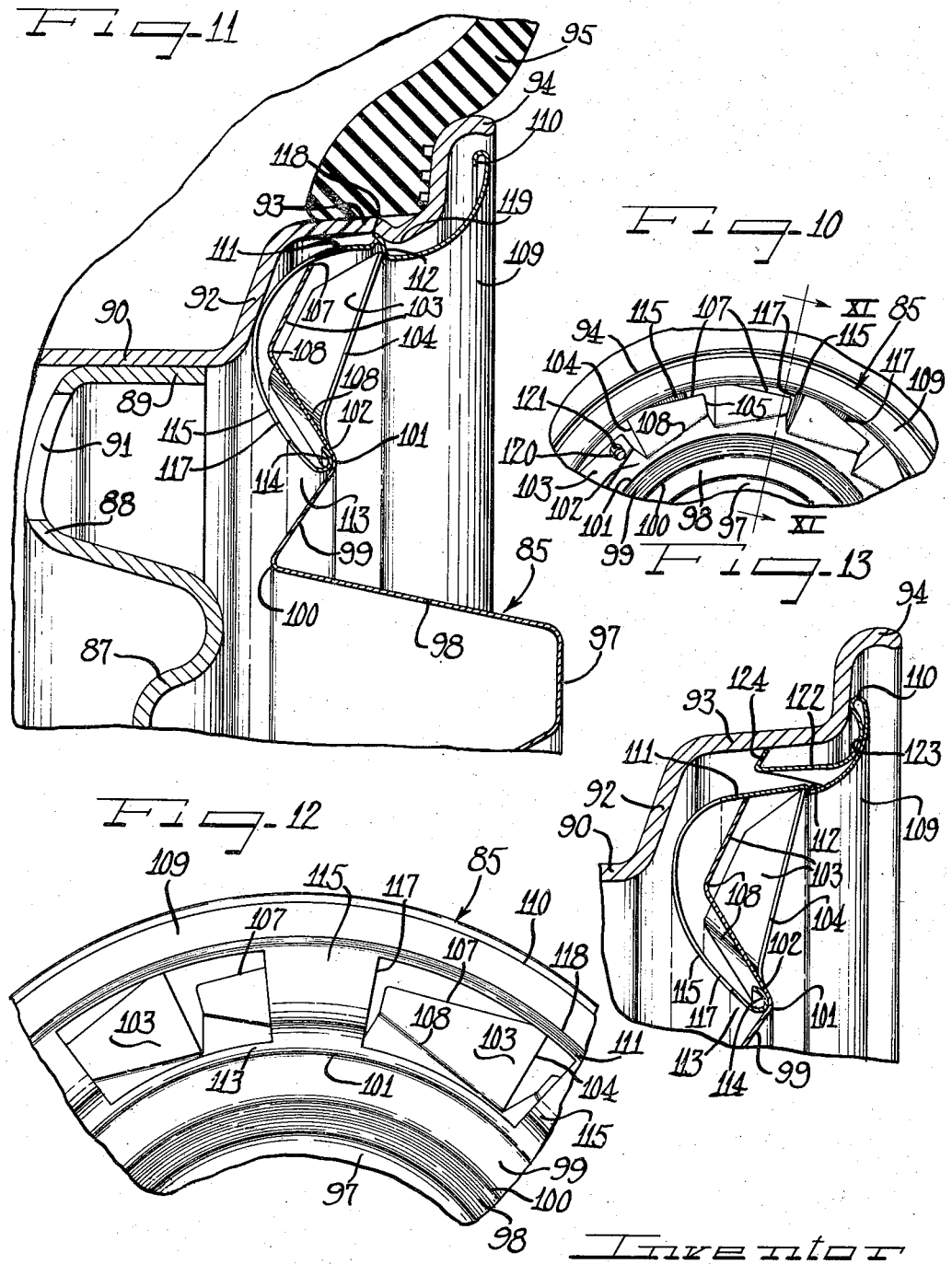

United States Patent Office 2,857,023
Patented Oct. 21, 1958

2,857,023

WHEEL COVER

George Albert Lyon, Detroit, Mich.

Application February 21, 1955, Serial No. 489,471

17 Claims. (Cl. 188—264)

The present invention relates to improvements in wheel structures and more particularly concerns the ornamental and protective covering of the outer side of vehicle wheels.

This application is a continuation-in-part of my copending application Serial No. 290,458 filed May 28, 1952, now abandoned.

An important object of the present invention is to provide an improved vehicle wheel cover having novel means cooperating with the tire rim of the wheel for retaining the cover in assembly on the wheel.

Another object of the present invention is to provide an improved wheel structure wherein a cover for the outer side of the wheel has improved means for retaining the cover and also serving as an air circulation promoting structure.

A further object of the present invention is to provide an improved wheel cover having air circulation promoting vanes thereon which are also utilized for gripping a flange of the vehicle wheel to retain the cover on the wheel.

Still another object of the invention is to provide a wheel cover having novel peripheral cover retaining fingers.

Yet another object of the invention is to provide a novel cover construction which is adapted not only for use in direct retaining engagement with a wheel flange but is also adapted for composite wheel cover assembly.

It is also an object of the invention to provide a novel two-part cover structure in which a central cover portion has retaining vane finger flanges maintaining the same in assembly with an annular trim ring cover member which is engageable in snap-on, pry-off relation with the tire rim of a wheel.

Other objects, features and advantages of the present invention will be readily apparent from the following detailed description of certain preferred embodiments thereof taken in conjunction with the accompanying drawings, in which:

Figure 1 is a side elevational view of a vehicle wheel having a cover of the present invention applied thereto.

Figure 2 is an enlarged fragmentary radial sectional view taken substantially on the line II—II of Fig. 1.

Figure 3 is an enlarged fragmentary side elevational view of the cover.

Figure 4 is a side elevational view of a vehicle wheel having a modified form of the cover thereon.

Figure 5 is an enlarged fragmentary radial sectional view substantially on the line V—V of Fig. 4.

Fig. 6 is an enlarged fragmentary radial sectional view taken substantially on the line V—V of Fig. 4.

Figure 7 is a side elevational view of a vehicle wheel showing a further modification of the cover.

Figure 8 is an enlarged fragmentary radial sectional detail view taken substantially on the line VIII—VIII of Figure 7.

Figure 9 is a fragmentary side elevational view of the cover of Figs. 7 and 8.

Figure 10 is a fragmentary outer side elevational view of a wheel structure showing another modification involving a composite wheel cover.

Figure 11 is an enlarged fragmentary sectional detail view taken substantially on the line XI—XI of Fig. 10.

Figure 12 is a fragmentary rear elevational view of the cover of Fig. 11, and

Figure 13 is a fragmentary radial sectional view similar to Fig. 11 but showing still another modification.

Having reference to Figures 1, 2 and 3, a cover 10 is shown embodying features of the invention and adapted to be applied directly to the outer side of a vehicle wheel including a wheel body 11 and a tire rim 12. The wheel body may be of the disc spider type comprising a stamping of appropriate heavy gauge sheet metal including a marginal flange 13 inset at appropriate intervals to provide ventilation openings 14 at the periphery of the wheel, and bulged axially outwardly intermediately to provide an annular reenforcing nose bulge 15.

The peripheral flange 13 of the wheel body is appropriately secured to the base flange of the tire rim 12. The tire rim is of the multi-flange type and may comprise a rolled section of appropriate gauge sheet metal having a side flange 17 merging with an intermediate generally axially and radially outwardly tapering flange 18 which in turn merges with a terminal flange 19. The tire rim is adapted to support a pneumatic tire and tube assembly 20.

The side flange 17 of the tire rim has therein a valve stem opening 21 through which a valve stem 22 of the tire and tube assembly projects generally axially outwardly and radially inwardly.

The cover 10 is preferably made from appropriate gauge thin sheet metal that is adapted to be die pressed to form. The material of the cover may comprise stainless steel, brass or other appropriate metal that is possessed of satisfactory inherent resilient qualities and is susceptible of suitable finishing such as plating and polishing or burnishing.

For substantially fully covering the outer side of the wheel, the cover 10 comprises a body disc including a central dome shaped portion 23 which is preferably of a diameter to substantially cover the central portion of the wheel body 11 and the nose bulge 15. At its margin the dome body portion 23 has an annular inwardly directed reenforcing rib 24 which is adapted to seat against the radially outward side of the nose bulge 15 of the wheel body and at a point radially inwardly from the wheel openings 14.

The margin of the cover 10 is slotted so as to provide a uniform series of a cover-retaining and air circulation promoting vanes 25. These vanes are formed integral in one piece with the body 23 and are joined to the cover body in such a manner as to be resiliently tensionable upon retaining engagement with the intermediate flange 18 of the tire rim.

Each of the marginal vanes 25 is constructed and arranged not only to engage the tire rim flange 18 retainingly but also to promote air circulation behind the outer margin of the cover and through the air circulation openings 14 in the perpihery of the wheel body. To this end, each of the vanes 25 is of substantial width and relatively shorter than wide and is tilted relative to the cover body both peripherally and relative to the axis of the cover. Considered another way, each of the vanes 25 extends at a converging, oblique angle to the cover body and generally spirally tilted about the periphery so that the vanes while extending circumferentially of the cover are also transversely inclined relative thereto and face generally circumferentially. Thereby, each of the vanes 25 is provided with a generally axially outwardly and peripherally directed edge 27 and a generally axially inwardly and peripherally directed opposite side edge 28 and a generally radially outwardly directed end edge 29. Each of the vanes converges angularly with a base flange 30 extending generally radially inwardly and axially outwardly and merging with an annular axially outwardly extending reenforcing rib 31 provided in generally corrugated relation radially outwardly from and joining with the inwardly directed marginal reenforcing rib 24.

To afford the tilted disposition of the respective vanes 25, a juncture of the vanes with the base flange 30 in each instance is on a line angular to the periphery of the cover and affording a generally axially inwardly directed rib 32 from which the respective vanes extend generally radially and axially outwardly in their respective tilted relationships. By preference, the vanes are formed symmetrically and provide air circulation slots between the adjacent inwardly disposed edge 28 of one of the vanes and the adjacent outwardly directed edge 27 of the companion vane 25 in each instance.

The edges 29 of the vanes are formed on a diameter which is preferably slightly greater than the inwardly converging diameter of the intermediate flange 18 of the tire rim. Therefore, in applying the cover to the wheel, a generally centered relationship of the cover is effected with the innermost edge portions of the tilted vanes 25 engaging at the juncture of the intermediate flange 18 and the terminal flange 19 of the tire rim. Then an axially inward pressure is applied uniformly to the outer side of the cover and the edges 29 of the vanes slide cammingly inwardly along the inner surface of the intermediate flange 18. As the diameter of the intermediate flange tapers inwardly, the retaining vanes are gradually placed under radially inward tension so that they gradually wedge tighter and tighter against the intermediate flange until the cover bottoms at the inwardly directed rib 24 against the wheel body at the radially outer side of the nose bulge 15.

Enhancement of the gripping action of the vane edges 29 against the tire rim intermediate flange 18 is accomplished by having the edges formed on substantially parallel spiral lines generally complementary to the lines of engagement of the gripping edges 29 against the tire rim intermediate flange 18, as best seen in Figure 1.

Improved tensioning of the retaining vanes 25 results from the gradually diminishing length of each of the vanes from the outermost edges 27 to the innermost edges 28 thereof.

Anchorage against turning of the cover 10 on the wheel due to torque stresses in service, is attained by providing a valve stem aperture 33, in the innermost end portion of one of the vanes 25, of dimension to receive fairly closely a base portion of the valve stem 22 therethrough. As will be observed in Figure 2, the valve stem base is engaged by the edge defining the valve stem aperture 33 close to the side flange 17 of the tire rim where the valve stem 22 is fairly resistant to bending responsive to transversely applied pressure. Therefore, the valve stem base serves substantially to anchor the cover against turning on the wheel.

As will be observed in Figure 2, the substantial gaps between the adjacent off-set edges 27 and 28 of the vanes are disposed opposite the wheel openings 14 so that in service the gaps afford substantial openings through the margin of the cover for air circulation. Such circulation is substantially promoted by the tilted relationship of the several vanes 25 to the axis of rotation.

Removal of the cover 10 from the wheel is accomplished easily by means of a pry-off tool such as a screw-driver that may be levered against the tire rim terminal flange 19 and exert pry-off force against selected ones of the vanes 25 under the outermost margins of the vanes adjacent the edges 27 thereof for progressively prying the selected vanes from the retaining engagement with the tire rim intermediate flange 18. When several of the vanes on one peripheral portion of the cover have been loosened, the cover will be easily pried free from the tire rim by reason of the relaxing of the several vanes and disengagement from the tire rim.

In the modification of Figures 4, 5 and 6 the invention is disclosed as embodied in a trim ring 35 which is applied in the substantially covering relation to the tire rim 12 and over the junction between the tire rim and the wheel body 11 and the adjacent portion of the wheel body at the radially outer side of the nose bulge 15 of wheel body. With this arrangement, the central portion of the wheel body is covered by a hub cap 37 held on by conventional retaining clips at the center of the wheel (clips not shown).

The trim ring 35 comprises a body annulus 38 having its inner margin reenforced by a rib-like bead 39 formed by turning the inner edge of the ring under. Adjacent the bead 39 the ring is provided with an annular corrugation rib 40 projecting axially outwardly and merging at its radially outer side with an inwardly directed annular corrugation rib 41. Radially outwardly from the corrugation rib 41, the trim ring has a generally radially outwardly and axially inwardly directed body flange 42 from which extends a series of integral and preferably symmetrically formed and related cover retaining and air circulation promoting vanes 43.

Each of the vanes 43 is of gradual diminishing length from a longer side defined by a side edge 44 and from which the vanes slope generally axially inwardly toward an inner edge 45. A radially extending or end edge 47 of the vane 43 in each instance is preferably generally complementary to the inner surface of the tire rim intermediate flange 18 but is extended to a slightly greater diameter than the diameter of the tire rim flange so that in applying the trim ring to the wheel the several vanes 43 will be placed under tension to enhance the gripping action of the edges 47 against the tire rim intermediate flange.

To enhance the resilient tensioning action of the vanes 43, they are not only joined to the flange 42 along diagonally related juncture ribs 48 at which the vanes diverge generally radially and axially outwardly from the body of the trim ring, but the vanes are formed generally concave-convex to bulge outwardly as best seen in Figures 5 and 6. At the same time, however, the retaining edges 47 of the vanes are directed generally radially and axially outwardly so as to attain a thorough gripping, biting action against the tire rim flange.

At their outermost side portions, the vanes 43 are preferably provided with generally radially extending ear projections 49 to bear against the terminal flange 19 adjacent to juncture thereof with the intermediate flange 18 and assist in maintaining the trim ring in uniformly centered relation and in uniform axial disposition on the wheel.

Application of the trim ring 35 is accomplished similarly as application of the wheel cover 10. The trim ring is generally centered with respect to the outer side of the wheel and with a valve stem aperture 50 at the inner end portion of one of the vanes 43 and centered on the valve stem 22. Then the trim ring is uniformly pushed axially inwardly until the retaining vanes 43 have made uniform wedging, biting retaining engagement at their retaining edges 47 with the tire rim intermediate flange 18. When fully applied, the substantial slot gaps and side edge spaces between the respective vanes afford in the aggregate large air circulation opening passageway through the margin of the trim ring opposite the wheel openings 14, for promoting circulation of air through the wheel and through the trim ring in the service operation of the wheel. Removal of the trim ring is effected by levering a pry-off tool against the margins at edges 44 of a succession of the vanes at one side of the assembly until the trim ring is dislodged.

In the modification of Figures 7, 8 and 9, a structure is shown that may be embodied in either a full disc cover or a trim ring, but as shown for purpose of illustration is a full disc type of cover 55. In this form of the invention, the cover is adapted to be applied to a vehicle wheel including a wheel body 57 and a tire rim 58, on much the same order as the wheel described in Figure 2 but differing therefrom in that the tire rim has a side flange 59 merging with an intermediate flange 60 having at the juncture of the side and intermediate flanges a generally radially projecting annular rib 61 providing a generally radially inwardly directed groove 62 defined at the outer side by a shoulder 63. At its axially outer margin the intermediate flange 60 merges with a terminal flange 64.

The wheel cover 55 comprises a central crowned body portion 65 which has as its perimeter a series of annular corrugation ribs 67 projecting generally axially outwardly and alternating with generally axially inwardly directed reenforcing and corrugation ribs 68 which in the assembly oppose and may bear against the radially outer side of a nose bulge 69 of the wheel body. Radially outwardly from the corrugations 67 and 68, the cover body has a generally radially outwardly and axially inwardly directed marginal flange portion 70 from which extends a symmetrical series of tilted air circulation and retaining vanes 71. Each of the vanes extends in diverging relation to the flange 70 generally radially and axially outwardly from a juncture rib 72.

In addition to being tilted, generally axially outwardly, each of the vanes 71 is also tilted in a peripheral direction with a generally axially outwardly directed side edge 73 at the outermost side of the vane and an inner side edge 74 at the opposite inwardly directed side of the vane. Each vane has a radially extending end edge 75 of substantial length arranged to oppose the tire rim.

In the present instance, however, retaining engagement of the vanes 71 with the tire rim is effected by means of integral angular respective retaining lug extensions 77 at the inner end portion of each of the vanes. These retaining lug extensions are directed generally radially outwardly and axially inwardly and are so constructed and related that they will engage retainingly under resilient tension behind the shoulder 63 on the tire rim intermediate flange 60. For this purpose, each of the retaining lugs 77 is angularly off-set from the body of the associated vane 71 by means of an off-setting angular flange 78 and each of the retaining lugs has a rounded edge that is adapted to engage cammingly under tension behind the shoulder 63. At its outer end portion, each of the vanes 71 has a turned ear extension 79 that is adapted to overlie the terminal flange 64 adjacent to the juncture thereof with the intermediate flange 60.

In applying the cover 55 to the wheel, the retaining lugs 77 are engaged against the shoulder at the juncture of the intermediate flange with the terminal flange on the tire rim and the cover then pushed axially inwardly to cause the lugs 77 to cam in along the intermediate flange 60 until the lugs 77 are resiliently stressed inwardly past the shoulder 63 behind which they snap to draw the cover axially inwardly and draw the limiting ears 79 tightly against the terminal flange 64 to thus hold the cover in snug non-rattling engagement with the tire rim and against the unintentional axial displacement from the wheel.

Turning of the cover on the wheel is prevented by engagement of the innermost end portion of one of the vanes 71 with the base portion of a valve stem 80 which projects snugly through a valve stem aperture 81. In service, the substantial gaps or openings between the adjacent ends of the vanes enable efficient air circulation through the margin of the cover and through wheel openings 82 provided at juncture of the wheel body 57 with the base flange of the tire rim 58.

Removal of the cover 55 from the wheel is accomplished by levering behind selected adjacent ones of the vanes 71 to dislodge the retaining lugs or fingers 77 from behind the shoulder 63. To assist in this the end or radially outer edges 75 of the vanes may be intermediately spaced from the tire rim intermediate flange sufficiently to enable insertion of the tip of a pry-off tool therebehind to flex the respective vanes 71 for camming the associated retaining lugs 77 free from the tire rim shoulder.

In the modification of Figures 10–12, a cover 85 is constructed and arranged for disposition at the outer side of a vehicle wheel having a wheel body 87 provided with an outer marginal inset annular portion 88 providing an outwardly opening groove defined at its radially outer side by an axially outwardly directed attachment flange 89 secured as by means of welding or riveting to a base flange 90 of a tire rim. In the bottom of the groove defined by the portion 88 is a series of air circulation openings 91. From the base flange 90 extends a generally axially outwardly facing and radially extending side flange 92 merging with an intermediate radially inwardly facing and generally axially outwardly extending flange 93 leading to a terminal flange 94 which extends radially outwardly and then turns axially outwardly. In this instance the tire rim is shown as having mounted thereon a tubeless pneumatic tire 95.

It has been found that the present invention is well adapted to the provision of a cover having a deep draw crown structure wherein the central portion of the cover is disposed in unusually axially outwardly offset relation to a deeply inset intermediate portion of the cover surrounding the crown portion. Such a cover has substantial appeal, especially for the more expensive types of automobiles because of the unusually rich ornamental effects that can be attained thereby. To this end, the cover 85 has a high crown 97 for overlying the central portion of the wheel body 87 and including a steeply frusto-conical side wall 98 that is adapted to extend deeply into the wheel and merges with an annular generally radially and axially outwardy oblique intermediate cover flange portion 99 joining the same on a rigidly reinforcing axially inwardly directed rib structure 100. At its axially outer terminus, the flange 99 joins, through the medium of an axially outwardly directed annular reinforcing rib 101, a generally axially inwardly and radially outwardly sloping annular flange portion 102 from which extends a uniform series of marginal finger vane flange portions 103 extending both radially and circumferentially on the cover in a general spirally tilted arrangement to face generally circumferentially, and of substantially the same structure as the vanes 25 of the wheel cover 10. Each of the vanes 103 is provided with a generally axially outwardly and circumferentially directed side edge 104, a generally axially inwardly and oppositely circumferentially directed opposite side edge 105, and a generally radially outwardly directed end edge 107 of substantial circumferential width. The tilted disposition of the respective vanes 103 is provided by an angular juncture 108 with the base flange 102 from which the vanes extend. Intermediate the vanes substantial air circulation openings are provided as well visualized from Figures 10 and 12.

Instead of having the end edges 107 of the vanes 103 in direct retaining engagement with the tire rim, an annular trim ring cover member 109 is provided for overlying disposition to the tire rim, with the radially outer portion of the member 109 of transversely arched form to overlie the terminal flange 94 and extend generally axially inwardly about the juncture of the terminal and intermediate flanges. At its outer extremity the cover member 109 is provided with an underturned reinforcing and finishing bead-like flange 110.

The construction and relationship of the cover member 109 to the inner crown cover member is such that the vanes 103 retainingly interengage with the annular cover member 109, and the cover member 109 retainingly interengages with the tire rim for retaining the cover assembly on the wheel. For this purpose, the cover member 109 is provided with a generally axially inwardly extending annular intermediate wall portion 111 with which the outer edges 107 and more particularly the radially and axially outermost tip portions at juncture of the end edges 107 and the side edges 104 interengage retainingly with the wall portion 111. To assure unitary assembly of the radially inner and outer cover portions or members, the wall member 111 is of a diameter to be engaged by the tips of the retaining fingers under resilient tension similarly as the retaining fingers 25 of the cover 10 engage the intermediate flange of the tire rim. In addition, however, means are provided for effecting an interlocking engagement so as to avoid inadvertent separation of the cover members, such means comprising herein an interlock annular generally axially inwardly facing, overhanging shoulder 112 in the cover member wall 111 behind which the tips of the fingers 103 are engageable under axially inward retaining tension.

To assure the axially inward tension on the interlocked fingers 103, the cover member 109 has a radially inner portion which is engageable against the back of the inner cover member, in order to provide an assembly stop or means to retain the inner cover member in a predetermined axial assembled relationship to the outer cover member 109. Herein the inner stop or engagement means of the outer cover member 109 comprises a generally radially inwardly directed inner marginal portion 113 having an inner extremity in the form of a turned bead-like substantially rigid annular terminal 114 which in assembly is arranged to engage within the groove defined behind the rib 101 of the inner cover member. Connecting the inner marginal flange 113 with the wall 111 is a series of generally radially extending spoke-like portions 115 formed integrally in one piece with the remainder of the cover member 109 and having intermediately thereof large openings 117 generally opposite the wheel openings 91 for air circulation through the openings as enhanced in the rotation of the wheel by action of the vane fingers 103. It will be observed that the openings 117 are of substantial radial extent as well as circumferential extent behind the vanes 103.

The spoke portions 115 are resiliently flexible and are bowed axially inwardly not only to clear the axially inwardly directed portions of the retaining and air circulation vanes 103 in spaced relation, but also to serve as bottoming supports for the cover against the tire rim side flange 92.

The construction and relationship of the stop shoulder bead 114 and the interlock shoulder 112 is such that the axially outward disposition of the bead shoulder 114 is initially slightly further than the axial disposition of the rib 101 of the inner cover member after the vanes 103 have been assembled behind the retaining shoulder 112. As a result, after assembly of the vanes 103 behind the shoulder 112, the retaining rib 114 is placed under resilient tensioning thrust into the groove within the rib 101 by resilient flexure of the spokes 115. Such resilient thrust of the shoulder rib 114, of course, has the effect of pushing axially outwardly on the inner cover member to thereby effect axially outward tensioned thrust of the tips of the vanes 103 against the shoulder 112. This assures a snug, rattle-free cooperative relationship of the assembled components of the cover. Not only are the vanes 103 under resilient radially inward deflectional tension, but also axially outward tensioned engagement with the outer cover member 109.

For retaining the cover assembly on the wheel, the outer cover member 109 may be provided with a generally radially outwardly projecting annular retaining rib 118 formed in the wall 111 thereof and projecting to a larger diameter than the diameter described about the radially inwardly projecting tips of a series of cover retaining bumps 119 provided on the axially outer portion of the intermediate flange 93 of the tire rim. Since the generally axially extending wall 111 of the outer cover member 109 is of smaller diameter than the intermediate flange 93 so as to be in assembly in generally telescoped spaced relation thereto, and the extent of the wall 111 is such as to enable a reasonable amount of axially inward deflection thereof, the retaining rib 118 is radially resiliently deflectable to the limited extent necessary to snap the same behind the retaining bumps 119. Since the inner cover vane fingers 103 are resiliently flexible, they will enable local radially inward flexing of the retaining rib 118 to the limited extent necessary to snap behind the bumps 119. Resilient engagement of the spokes 115 against the side flange 92 cooperates with the retaining rib 118 to maintain the same in snug inwardly camming engagement with the retaining bump shoulders.

In applying the cover assembly 85 to the outer side of the wheel, the cover is generally centered with respect to the wheel and a valve stem aperture 120 (Fig. 10) in the axially inner end or side portion of one of the vanes 103 is registered with a valve stem 121 which extends from the side flange 92 through one of the openings 117. Since such registration of the valve stem through the valve stem aperture requires a canted approach of the cover to the wheel, engagement of the retaining rib 118 behind an adjacent pair of the retaining bumps 119, of which there may be four equidistantly spaced on the wheel, facilitates snapping of the rib 118 into engagement with the remaining retaining bumps. On the wheel the cover is supported in cushioned engagement with the tire rim and in spaced relation to the wheel body.

For removing the cover 85 from the wheel, a pry-off tool is inserted between the terminal flange 94 and the outer marginal portion of the outer cover member 109 and especially the outer turned reinforcing bead 110 thereof and pry-off force applied which will effect camming of the retaining rib 118 out of engagement with the remaining bumps 119.

In the modification of Fig. 13, the wheel and the cover are of substantially the same construction as in Fig. 11 and therefore similar reference numerals identify the corresponding parts or elements. The principal difference in the form of Fig. 13 resides in that instead of the cover being retained on the wheel by engagement with retaining bumps on the tire rim, the cover, and more particularly the outer cover member 109, has retaining fingers 122 thereon extending generally axially inwardly between the wall portion 111 and the intermediate flange 93 as extensions from an annular generally radially and inwardly extending flange 123 provided as an inward continuation of the underturned marginal bead flange 110. At their terminals the retaining fingers 122 are provided with short and stiff generally radially and axially outwardly oblique retaining terminals 124 which are engageable in press-on, pry-off direct retaining gripping engagement with the inner face of the intermediate flange 93 of the tire rim. In this modification, of course, the space between the generally axially extending wall portion 111 of the outer cover member and the intermediate flange is somewhat greater than in Fig. 11 so as to accommodate radial flexing of the retaining fingers 122. Moreover, instead of the inwardly bowed spoke elements 115 bearing against the side flange 92, it is preferable in the form of Fig. 13 to have the outer underturned bead flange 110 rest against the inner portion of the terminal flange 94.

In both forms of the cover shown in Figs. 11 and 13, assembly of the cover components is effected by pressing the retaining finger vanes 103 axially inwardly into engagement with the outer cover wall portion 111 behind the retaining shoulder 112. This effects resilient tensioned interengagement of the cover components.

In all forms of the cover, of course, air circulation is promoted in the rotation of the wheel by action of the tilted vanes which, in rotation of the wheel in one direction will promote circulation from the outer side of the wheel inwardly through the cover and through the wheel openings. In the opposite rotational direction an aspirating action is effected whereby air is drawn outwardly through the openings in the wheel and out through the cover between the several vanes.

It will be understood that modifications and variations may be effected without departing from the scope of the novel concepts of the present invention.

I claim as my invention:

1. In a wheel structure including a body member and a multi-flanged tire rim having a generally axially extending tapered intermediate flange and a terminal flange, a cover for the outer side of the wheel comprising a member having at the margin thereof a series of vanes extending circumferentially of the cover and being transversely inclined, said vanes each having side edges respectively disposed in generally axially offset relation and end edges directed generally radially outwardly and retainingly engageable with the tire rim intermediate flange, and flange means projecting radially beyond said edges for overlying the tire rim terminal flange.

2. In a wheel structure including a tire rim having an intermediate flange and a side flange with a valve stem projecting therethrough, a cover for the outer side of the wheel comprising a cover body having a series of generally radially outwardly extending retaining elements including radially outer portions thereof retainingly engageable with the tire rim intermediate flange, one of said elements having a valve stem opening defined by a margin engageable about the valve stem to hold the cover against turning on the wheel.

3. In a wheel structure including a wheel body and a flanged tire rim with air circulation openings through the wheel adjacent juncture of the body and rim, a cover for disposition at the outer side of the wheel, comprising a cover body overlying the wheel body and having a marginal series of vanes extending peripherally of the cover across said juncture and being transversely inclined so that the side edges of adjacent vanes are offset relative to the side edge of adjacent vanes, the spaces between the side edges of the vanes providing substantial air gaps in communication with said wheel openings for circulation of air through the cover, said vanes having end edges retainingly engageable in press-on, pry-off relation with a flange of the tire rim.

4. In a wheel structure including a wheel body and a tire rim and with air circulation openings through the wheel adjacent juncture of the body and rim, a cover for disposition at the outer side of the wheel, comprising a cover body overlying the wheel body and having a marginal generally radially projecting series of vanes extending peripherally of the cover across said juncture and being transversely inclined so that the side edges of adjacent vanes are relatively spaced, the spaces between the side edges of the vanes providing substantial air gaps in communication with said wheel openings for circulation of air through the cover, the radially projecting end margins of the vanes having means for retaining engagement with a flange of the wheel.

5. In a wheel structure including a wheel body and a tire rim and having air circulation openings through the wheel, a cover for disposition at the outer side of the wheel, comprising a cover body having a marginal series of vanes extending peripherally of the cover and being transversely inclined so that the side edges of adjacent vanes are relatively offset, the spaces between the side edges of the vanes providing substantial air gaps for circulation of air through the cover, said vanes being disposed in respective helical planes and being of gradually diminishing length from the axially outer side to the axially inner side of the respective vanes.

6. In a wheel structure including a wheel having flanged tire rim and body parts, a circular wheel cover having a radially outer peripheral margin provided with a plurality of spaced generally radial slots which form said margin into spaced radial vane-like segments, each of said segments being transversely inclined so that it has an axially outer side portion with an end for engagement with an axially outer surface of the rim flange and an axially inner side portion with an end for disposition inside the rim flange and connected to said outer side portion end by an edge for resilient cover retaining engagement with a surface of the rim flange.

7. In a wheel structure including a wheel body and a tire rim with wheel openings adjacent juncture thereof, with a generally radially inwardly facing annular surface located inwardly from the outer extremity of the tire rim, a cover member for disposition at the outer side of the wheel including a circular body portion having a peripheral area thereon subdivided into a series of retaining and air circulation vanes providing openings therebetween for air circulation registration with the openings in the wheel and having radially outwardly directed retaining edges, said vanes being connected to said body portion on juncture ribs and being tilted to face generally circumferentially, said vane edges being in retaining engagement with said radially inwardly facing surface under resilient tensioned thrust.

8. In a cover for disposition at the outer side of a vehicle wheel, a radially inner circular cover member having a marginal portion thereof subdivided into a plurality of generally radially outwardly directed vanes, and an annular radially outer cover member having a wall portion thereof retainingly interengaged by said vanes, said outer cover member having a part thereof engaging the inner cover member radially inwardly adjacent to juncture of said vanes with the inner cover member and provided with openings for air circulation therethrough as motivated by the vanes on turning of the cover in service.

9. In a cover for disposition at the outer side of a vehicle wheel, a radially inner circular cover member and a radially outer circular cover member, said inner circular cover member having generally radially outwardly directed resilient vane finger elements, the outer circular cover member having a generally radially inwardly facing surface engageable under resilient tension by said finger vanes, and an interlock shoulder on said outer cover member cooperating with the tips of the vanes to prevent axial separation of the vanes relative to the outer cover member.

10. In a cover for disposition at the outer side of a vehicle wheel, a radially inner circular cover member and a radially outer circular cover member, said inner circular cover member having generally radially outwardly directed resilient vane finger elements, the outer circular cover member having a generally radially inwardly facing surface engageable under resilient tension by said finger vanes, and an interlock shoulder on said outer cover member cooperating with the tips of the vanes to prevent axial separation of the vanes relative to the outer cover member, said outer cover member having a portion extending behind said vanes and engaging the inner cover member radially inwardly of the vanes and placing the vanes under radially outward resilient tensioned engagement against said shoulder.

11. In a cover assembly for disposition at the outer side of a vehicle wheel, a circular radially inner cover member and a circular radially outer cover member, the inner cover member having a radially outer marginal structure separated into a series of generally radially outwardly extending resilient retaining and air circulation vane elements, the radially outer cover member having an inwardly dished generally channel shaped portion with openings in the bottom of the channel and with a radially outer wall portion engaged in retaining relation by the radially outer tips of said vanes whereby to retain the cover members in unitary assembly.

12. In a wheel structure including a wheel body and a tire rim with wheel openings adajacent juncture of the body and rim, an annular cover member dimensioned for generally telescoped disposition within the tire rim and having a radially inwardly facing annular surface, said annular cover member having means thereon for retaining the same on the tire rim, and a second cover member for disposition over the wheel within said annular surface and including a circular body portion having a peripheral area thereon subdivided into a series of retaining and air circulation vanes providing openings therebetween for air circulation passage therethrough and through the openings in the wheel, said vanes having radially outwardly directed retaining edges in retaining engagement with said radially inwardly facing surface under resilient tensioned thrust, said vanes being tilted to face generally circumferentially for promoting air circulation through said openings.

13. In a wheel structure including a wheel body and a tire rim with wheel openings adjacent juncture of the body and rim, an annular cover member dimensioned for generally telescoped disposition within the tire rim and having a radially inwardly facing annular surface, said annular cover member having means thereon for retaining the same on the tire rim, and a second cover member for disposition over the wheel within said annular surface and including a circular body portion having a peripheral area thereon subdivided into a series of retaining and air circulation vanes providing openings therebetween for air circulation passage therethrough and through the openings in the wheel, said vanes having radially outwardly directed retaining edges in retaining engagement with said radially inwardly facing surface under resilient tensioned thrust, said vanes being tilted to face generally circumferentially for promoting air circulation through said openings, said cover retaining means on the annular cover member being in the form of a shoulder structure engageable with retaining bumps on the tire rim.

14. In a wheel structure including a wheel body and a tire rim with wheel openings adjacent juncture of the body and rim, an annular cover member dimensioned for generally telescoped disposition within the tire rim and having a radially inwardly facing annular surface, said annular cover member having means thereon for retaining the same on the tire rim, and a second cover member for disposition over the wheel within said annular surface and including a circular body portion having a peripheral area thereon subdivided into a series of retaining and air circulation vanes providing openings therebetween for air circulation passage therethrough and through the openings in the wheel, said vanes having radially outwardly directed retaining edges in retaining engagement with said radially inwardly facing surface under resilient tensioned thrust, said vanes being tilted to face generally circumferentially for promoting air circulation through said openings, said retaining means on the annular cover member being in the form of retaining fingers disposed behind the annular cover member and retainingly engageable in press-on, pry-off relation with a flange of the tire rim.

15. In a wheel structure including a multi-flanged tire rim having a generally axially extending and radially inwardly facing annular flange and a wheel body supporting the tire rim and provided with air circulation openings adjacent juncture with the tire rim, a cover for the outer side of the wheel comprising a circular sheet metal member for overlying the wheel body and having at the radially outer margin thereof a series of cover retaining and air circulation promoting vanes providing air circulation openings therebetween and joined angularly to the cover member on rib-like junctures, said vanes having their major dimension through their width and being transversely tilted so that the side edges of adjacent vanes are respectively offset to increase the size of the openings between the vanes with a minimum of gap appearing from the front of the cover, said vanes extending radially and axially outwardly and having radially outer end edges engageable in press-on, pry-off relation with said rim flange under resilient tension of the vanes from said juncture ribs radially outwardly.

16. In a wheel structure including a multi-flanged tire rim having a generally axially extending and radially inwardly facing annular flange and a wheel body supporting the tire rim and providing with air circulation openings adjacent juncture with the tire rim, a cover for the outer side of the wheel comprising a circular sheet metal member for overlying the wheel body and having at the radially outer margin thereof a series of cover retaining and air circulation promoting vanes providing air circulation openings therebetween and joined angularly to the cover member on rib-like junctures, said vanes having their major dimension through their width and being transversely tilted so that the side edges of adjacent vanes are respectively offset to increase the size of the openings between the vanes with a minimum of gap appearing from the front of the cover, said vanes extending radially and axially outwardly and having radially outer end edges engageable in press-on, pry-off relation with said rim flange under resilient tension of the vanes from said juncture ribs radially outwardly, said tire rim having therein an annular radially inwardly opening groove adjacent the axially inner end of said radially facing flange and the vanes having on the axially innermost portions of said radially extending edges lugs that retainingly engage under tension within said groove.

17. In a cover for disposition at the outer side of a vehicle wheel, a circular sheet metal body with a generally frusto-conical annular margin including integral extensions therefrom separated by slitting of the distal extremity portion of said margin transversely thereacross at uniform circumferentially spaced intervals and running out at the edge of the margin to provide a series of spoke sections having connection with the margin on bend lines which for each of said sections extends obliquely from closely adjacent to the inner end of the slit at one side of the spoke section to a point intermediate the length of the slit at the opposite side of such section, the free or distal portion of the section along the bend line in each instance extending in oblique relation to the cover body along said line and into oblique relation to the frusto-conical marginal portion adjacent to the body and divergently to provide respective vanes and cover-retaining fingers, with the adjacent sides of the vane finger spoke sections relatively offset and providing air circulation gaps therebetween.

References Cited in the file of this patent

UNITED STATES PATENTS

| Re. 20,553 | Lyon | Nov. 16, 1937 |
| 2,345,283 | Mulhern | Mar. 28, 1944 |
| 2,444,054 | Lyon | June 29, 1948 |

FOREIGN PATENTS

| 7,862 | Australia | June 20, 1927 |